(12) United States Patent
Yang

(10) Patent No.: US 6,633,601 B1
(45) Date of Patent: Oct. 14, 2003

(54) METHOD AND DEVICE FOR FRAME RATE DETERMINATION USING CORRELATION METRICS AND FRAME QUALITY INDICATORS

(75) Inventor: Gordon Guowen Yang, Richmond (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/321,699

(22) Filed: May 28, 1999

(51) Int. Cl.⁷ .................................................. H04B 1/69
(52) U.S. Cl. ........................ 375/142; 375/150; 375/340; 375/341; 370/342
(58) Field of Search ................................ 370/232, 233, 370/234, 252, 253, 342; 375/225, 227, 340, 341, 343, 377, 130, 142, 147, 150; 455/67.3, 115, 226.1

(56) References Cited

U.S. PATENT DOCUMENTS 5,396,516 A * 3/1995 Padovani et al. ........... 375/225
5,566,206 A * 10/1996 Butler et al. ................ 375/225
5,710,784 A * 1/1998 Kindred et al. ............. 375/22
5,751,725 A * 5/1998 Chen .......................... 714/708
5,802,105 A * 9/1998 Tiedemann, Jr. et al. ... 375/225
6,067,458 A * 5/2000 Chen .......................... 455/522
6,147,964 A * 11/2000 Black et al. ................ 370/209
6,175,590 B1 * 1/2001 Stein .......................... 375/225
6,222,875 B1 * 4/2001 Dahlman et al. ........... 375/200

* cited by examiner

Primary Examiner—Dwayne Bost
Assistant Examiner—Temica M. Davis
(74) Attorney, Agent, or Firm—Peter Zawilski

(57) ABSTRACT

A method and device for determining a frame rate of a data fame transmitted over a variable rate communication system. In one embodiment, the present invention receives demodulated soft symbols representing a data frame transmitted at a certain frame rate. The present invention then generates a plurality of decoded bit streams from the demodulated soft symbols, where each of the plurality of decoded bit streams is for testing one of a plurality of rate hypotheses for the frame rate of the data frame. The present invention next re-encodes each of the plurality of decoded bit streams to generate a plurality of re-encoded bit streams, each of which corresponds to a plurality of decoded bit streams.

29 Claims, 8 Drawing Sheets

METHOD AND DEVICE FOR FRAME RATE DETERMINATION USING CORRELATION METRICS AND FRAME QUALITY INDICATORS

TECHNICAL FIELD

The present claimed invention relates to the field of cellular telephony. More specifically, the present claimed invention relates to frame rate determination in variable rate communication systems such as Code Division Multiple Access (CDMA) cellular systems.

BACKGROUND ART

Cellular telephony has become a widely available mode of communication in modern society. Variable rate communication systems, such as Code Division Multiple Access (CDMA) spread spectrum systems, are among the most commonly deployed cellular technology. Variable rate communication systems transmit data in units called data frames and, as its name indicates, at various frame rates. Moreover, in the case of CDMA systems, frame rate information is not transmitted from the originating base station to the receiver, which is typically a mobile receiver unit like a handset. Thus, the receiver needs to determine the frame rate of any and all data frames received from the originating base station on a frame-by-frame basis. As such, the receiver needs to have a method for determining what frame rate a given data frame is being transmitted at when a data frame is received.

Generally, within a CDMA environment with a large number of users on the system, a high level of channel noise is usually present. In particular, each user is a source of noise to every other user on the same system. In the prior art, the symbol error rate, which is calculated based on hard-limited symbols, is used for frame rate determination. Nevertheless, it has been determined that such symbol error rate can often be a highly inaccurate predicate of the frame rate of a data frame when the data channel is very noisy. Such prior art approaches to frame rate determination are thus not practicable in a variable rate communication system with a noisy data channel. Therefore, a method and device which can accurately determine the frame rate of a data frame in a high noise level environment is needed.

Additionally, a method and device for determining the frame rate of a data frame in a high noise level, variable rate communication system must not require significant revamping of such existing communication systems. That is, in implementing a viable method and device for frame rate determination in a variable rate communication system, components that are well known in the art and are compatible with existing communication systems need to be used so that the cost of realizing the method and device is low. In so doing, the need to incur costly expenditures for retrofitting existing communication systems or for building custom components is eliminated.

Thus, a need exists for a method and device for frame rate determination in a variable rate communication system. A further need exists for a method and device which meets the above listed need wherein the method and device operates accurately in the presence of significant channel noise. Still another need exists for a method and system which meets both of the above cited needs and wherein the method and device is easy to implement and is conducive to use with existing variable rate communication systems.

DISCLOSURE OF THE INVENTION

The present invention provides a method and device for determining a frame rate of a data frame transmitted over a variable rate communication system. The present invention accomplishes the above achievements with a method and device which performs frame rate determination using correlation metrics and frame quality indicators. The present invention delivers accurate frame rate determination even in an environment with a high level of channel noise by using correlation metrics based on soft symbols rather than hard-limited symbols as are used in the prior art. Moreover, the present invention is easy to implement either by hardware or software, and is also conducive to use with existing variable rate communication systems such as a CDMA spread spectrum system.

Specifically, in one embodiment, the present invention receives demodulated soft symbols representing a data frame transmitted at a certain frame rate. The present invention then generates a plurality of decoded bit streams from the demodulated soft symbols, where each of the plurality of decoded bit streams is for testing one of a plurality of rate hypotheses for the frame rate of the data frame. The present invention next re-encodes each of the plurality of decoded bit streams to generate a plurality of re-encoded bit streams, each of which corresponds to one of the plurality of decoded bit streams. Then, the present invention generates a plurality of correlation metrics by correlating each of the plurality of re-encoded bit streams with the demodulated soft symbols, and also generates a plurality of frame quality indicators, such that a frame quality indicator is generated for each of the plurality of decoded bit streams which has a cyclic redundancy code (CRC) coupled thereto. Using the plurality of correlation metrics and the plurality of frame quality indicators, the present invention determines the frame rate of the transmitted data frame. In so doing, this embodiment of the present invention provides a method for frame rate determination in a variable rate communication system.

In another embodiment, the present invention includes the above recited steps and further the present invention processes the demodulated soft symbols using a first symbol manipulation scheme and, from the processed demodulated soft symbols, generates a first decoded bit stream for testing a first rate hypothesis for the frame rate. The present invention also processes the demodulated soft symbols using a second symbol manipulation scheme and, from the processed demodulated soft symbols, generates a second decoded bit stream for testing a second rate hypothesis for the frame rate.

The present invention also describes in detail the device for performing the steps of the above described method.

These and other advantages of the present invention will no doubt become clear to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
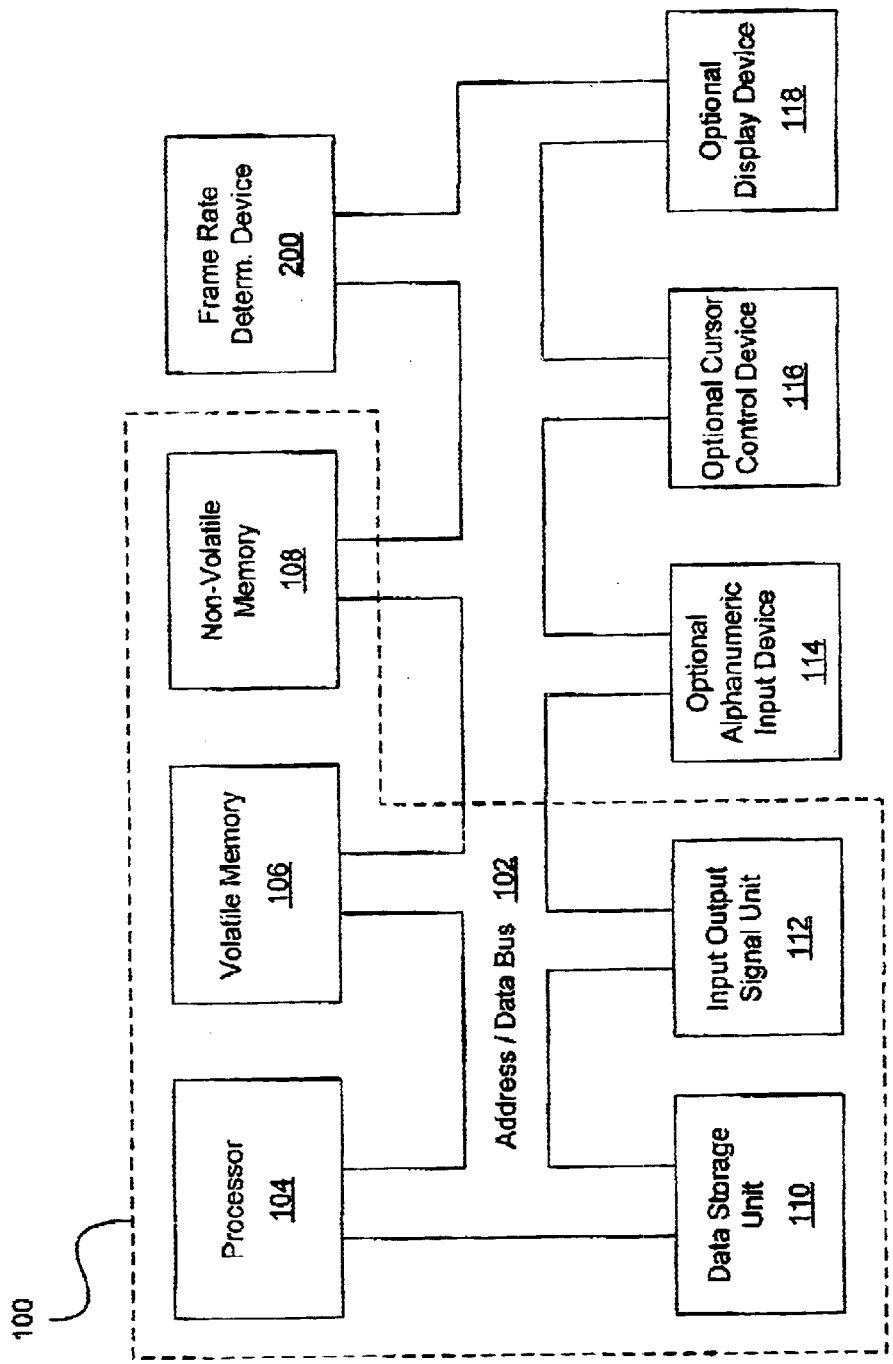
FIG. 1 is a schematic diagram of a general purpose computer system used to perform embodiments of the frame rate determination method of the present invention.
Figure 2A:
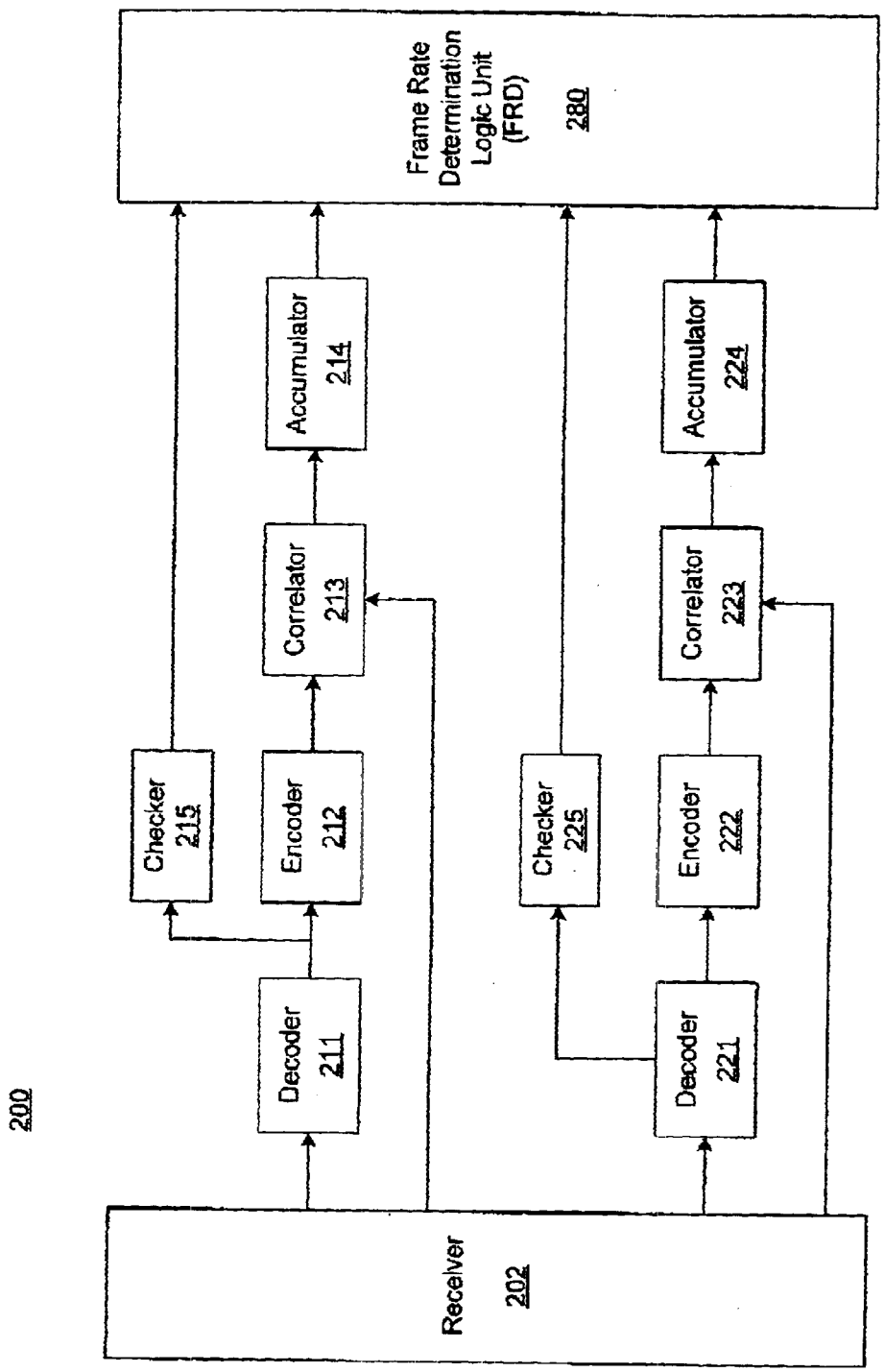
FIG. 2A is a schematic diagram of a frame rate determination device in accordance with one embodiment of the present invention.
Figure 2B:
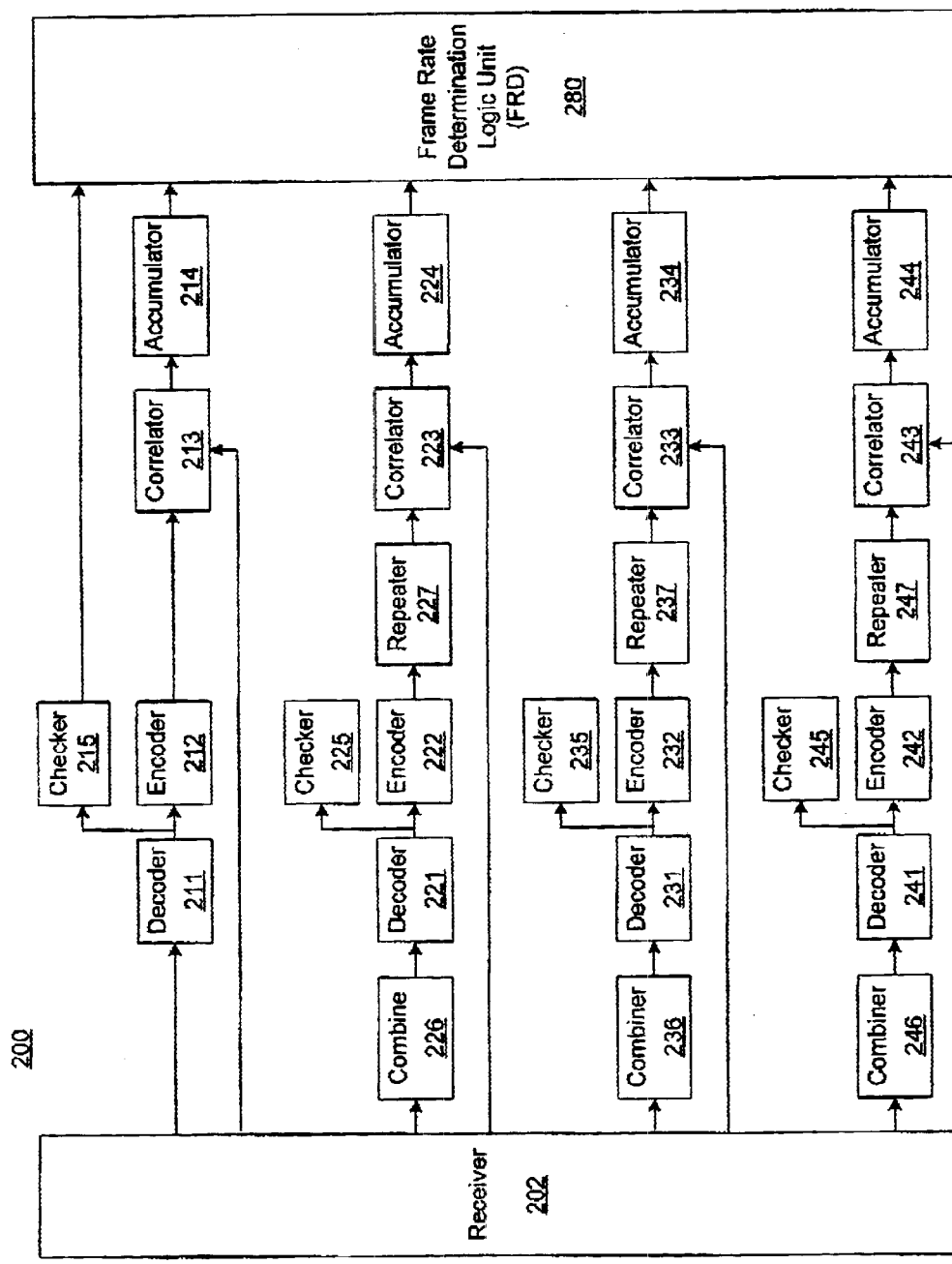
FIG. 2B is a schematic diagram of a frame rate determination device in accordance with another embodiment of the present invention.

The following description of the present invention will begin with a detailed description of the physical structure and architecture of the present invention with reference to FIGS. 1, 2A and 2B. This description will then be followed by a detailed description setting forth the operation of the present invention with reference to FIGS. 3 through 7.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing and communication arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "generating", "re-encoding", "determining" or the like, refer to the action and processes of a computer system (e.g., FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present inventions described below, are discussed in terms of steps executed on a computer system. These steps (e.g., processes 300, 400, 500, 600 and 700) are implemented as program code stored in computer readable memory units of a computer system and are executed by the processor of the computer system. Although a variety of different computer systems can be used with the present invention, an exemplary general purpose computer system 100 is shown in FIG. 1.

In general, computer system 100 includes an address/data bus 102 for communicating information, a central processor 104 coupled with the bus for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104. Computer system 100 also includes a data storage device 110 ("disk subsystem") such as a magnetic or optical disk and disk drive coupled with the bus 102 for storing information and instructions. Data storage device 110 can include one or more removable magnetic or optical storage media (e.g., diskettes, tapes) which are computer readable memories. Memory units of system 100 include 106, 108 and 110. Computer system 100 can also include a signal input output communication device 112 (e.g., modem, network interface card NIC) coupled to the bus 102 for interfacing with other computer systems.

Also included in computer system 100 of FIG. 1 is an optional alphanumeric input device 114 including alphanumeric and function keys coupled to the bus 102 for communicating information and command selections to the central processor 104. Computer system 100 also includes an optional cursor control or directing device 116 coupled to the bus 102 for communicating user input information and command selections to the central processor 104. An optional display device 118 can also be coupled to the bus 102 for displaying information to the computer user. Display device 118 may be a liquid crystal device, other flat panel display, cathode ray tube, or other display device suitable for creating graphic images and alphanumeric characters recognizable to the user. Cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands. Computer system 100 also includes frame rate determination device 200 coupled to the bus 102 for performing the computer implemented method for frame rate determination in accordance with the present invention. Frame rate determination device 200 is described in detail below.

It is appreciated that computer system 100 described herein illustrates an exemplary configuration of a communication device (e.g., a mobile handset) or its equivalent within a variable rate communication system in accordance with the present invention. Nevertheless, other computer systems with differing configurations or other communications devices, properly configured, can also be used in place of computer system 100 within the scope of the present invention.

Architecture of the Frame Rate Determination Device of the Present Invention With reference now to FIG. 2A, a schematic diagram of a frame rate determination device in accordance with one embodiment of the present invention is shown. Regarding the structure and architecture of the present invention, frame rate determination device 200 comprises receiver 202 which is adapted to receive data transmitted over a variable rate communication system. Frame rate determination device 200 further comprises decoders 211 and 221, each of which is coupled to receiver 202. Frame rate determination device 200 also comprises encoders 212 and 222 and checkers 215 and 225. Decoder 211 is coupled to encoder 212 and to checker 215, while decoder 221 is coupled to encoder 222 and to checker 225. Frame rate determination device 200 further comprises correlator 213, which is coupled to receiver 202 and encoder 212, and correlator 223, which is coupled to receiver 202 and encoder 222. Moreover, frame rate determination device 200 comprises accumulators 214 and 224, which are coupled to correlators 213 and 223, respectively. Further still, frame rate determination device 200 comprises frame rate determination logic unit (FRD) 280, which is coupled to each of accumulators 214 and 224 and also to each of checkers 215 and 225.

With reference next to FIG. 2B, a schematic diagram of a frame rate determination device in accordance with another embodiment of the present invention is shown. In this embodiment, frame rate determination device 200 comprises receiver 202 which is adapted to receive data transmitted over a variable rate communication system. Frame rate determination device 200 further comprises decoders 211, 221, 231 and 241, each of which is coupled to receiver 202. Frame rate determination device 200 also comprises combiners 226, 236 and 246 which are coupled between receiver 202 and, respectively, decoders 221, 231 and 241. Frame rate determination device 200 also comprises encoders 212, 222, 232 and 242 and checkers 215, 225, 235 and 245. Particularly, decoder 211 is coupled to encoder 212 and to checker 215, decoder 221 is coupled to encoder 222 and to checker 225, decoder 231 is coupled to encoder 232 and to checker 235, and decoder 241 is coupled to encoder 242 and to checker 245. Frame rate determination device 200 further comprises correlators 213, 223, 233 and 243, each of which is coupled to receiver 202. Furthermore, correlators 213, 223, 233 and 243 are also coupled to encoder 212, 222, 232 and 242, respectively.

Referring still to FIG. 2B, frame rate determination device 200 further comprises repeater 227 coupled between encoder 222 and correlator 223, repeater 237 coupled between encoder 232 and correlator 233, and repeater 247 coupled between encoder 242 and correlator 243. Also, frame rate determination device 200 comprises accumulators 214, 224, 234 and 244, which are coupled to correlators 213, 223, 233 and 243, respectively. Further still, frame rate determination device 200 comprises FRD 280, which is coupled to each of accumulators 214, 224, 234 and 244 and also to each of checkers 215, 225, 235 and 245.

The exemplary embodiment of frame rate determination device 200 as illustrated in FIG. 2B is particularly well-suited to perform frame rate determination in a CDMA spread spectrum system as described in the TR45 Standards, which is a digital cellular standard endorsed by the United States Telecommunications Industry Association/Electronic Industries Association (TIA/EIA). Currently, a TR45 CDMA system supports two rate sets for data transmission in the forward traffic channel, namely, rate set 1 and rate set 2, each rate set having four possible frame rates expressed in bits per second (bps). For rate set 1, data is transmitted at variable frame rates of 9600 bps (full rate), 4800 bps (half rate), 2400 bps (quarter rate) and 1200 bps (eighth rate), whereas for rate set 2, data is transmitted at variable frame rates of 14400 bps (full rate), 7200 bps (half rate), 3600 bps (quarter rate) and 1800 bps (eighth rate). It is appreciated that the frame rate is independently variable in each data frame. As mentioned above, information about the frame rate is not transmitted along with the data (e.g., demodulated soft symbols) from a base station to a receiver, and thus the frame rate of a transmitted data frame has to be determined by the receiver on a frame-by-frame basis. Accordingly, frame rate determination device 200 of FIG. 2B utilizes embodiments of the method of the present invention to test the received data frame against four rate hypotheses, each corresponding to one of the four frame rates of the respective rate set, in order to determine the actual frame rate at which the data frame has been transmitted.

Operation of the Frame Rate Determination Device of the Present Invention

Figure 3:
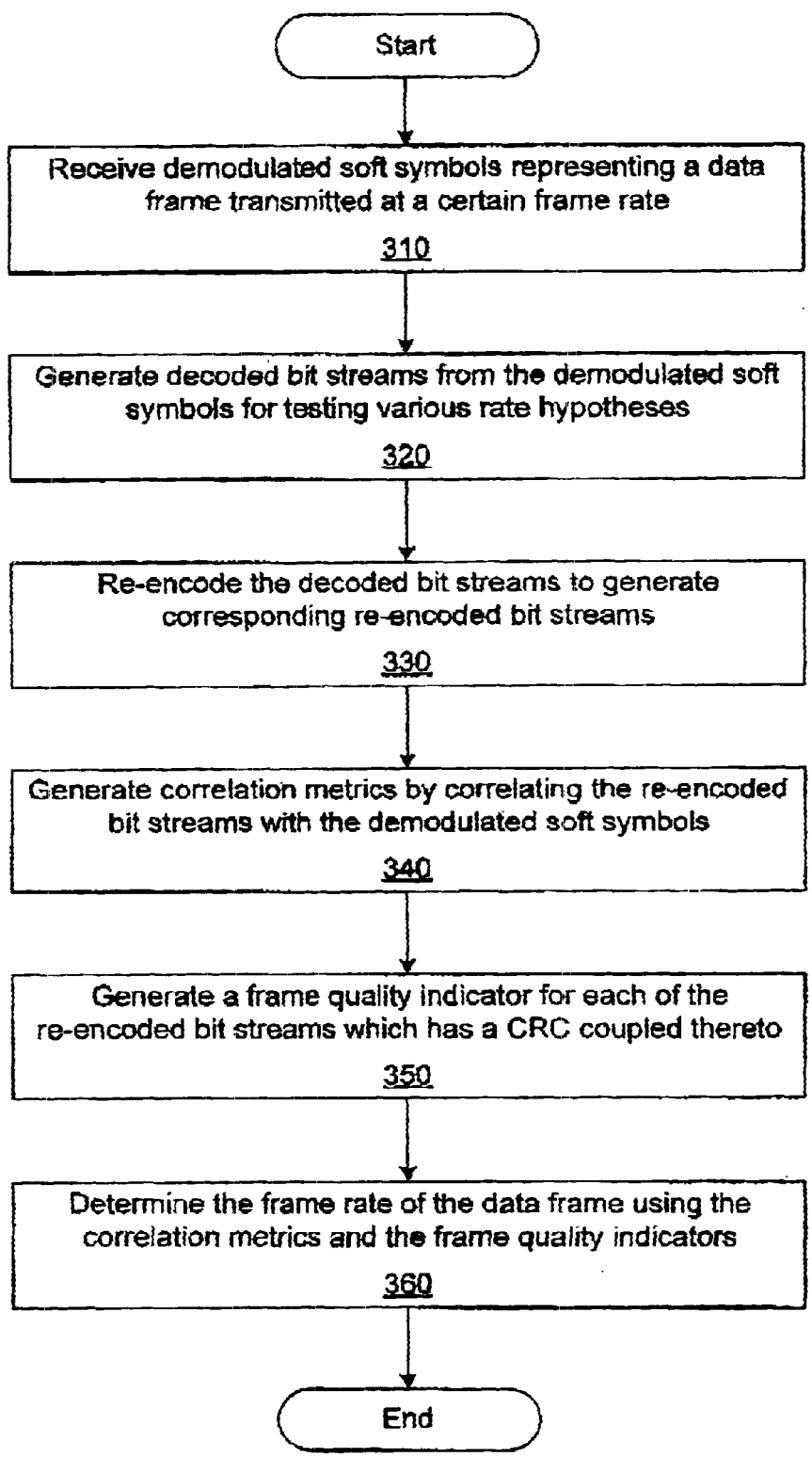
FIG. 3 is a flow chart of steps for performing frame rate determination in a variable rate communication system in accordance with one embodiment of the present invention.

The following is a detailed description of the operation of the present invention with reference to FIGS. 3 through 7. Referring now to FIG. 3, a flow chart 300 of steps for performing frame rate determination in a variable rate communication system in accordance with one embodiment of the present invention is shown. The steps of FIG. 3 will be described in conjunction with the embodiment of FIG. 2B. As shown in step 310, receiver 202 of frame rate determination device 200 receives demodulated soft symbols representing a data frame transmitted at a certain frame rate.

In one embodiment of the present invention, where a TR45 CDMA system is used, in the forward traffic channel, there are 384 demodulated soft symbols in each data frame irrespective of the frame rate at which the data frame is transmitted. The modulation symbol rate is kept constant by code repetition at 19200 symbols per seconds, and the frame rate variation is accomplished by 1, 2, 4, or 8-way repetition of code symbols. More specifically, code symbols are not repeated for the full rate data frames (9600 bps frames of rate set 1 and 14400 bps frames of rate set 2). Each code symbol in half rate data frames (4800 bps frames of rate set 1 and 7200 bps frames of rate set 2) is repeated once. In other words, each code symbol in half rate data frames occurs two consecutive times. Similarly, each code symbol in quarter rate data frames (2400 bps frames of rate set 1 and 3600 bps frames of rate set 2) is repeated three times, or stated differently, each code symbol in quarter rate data frames occurs four consecutive times. Likewise, each code symbol in eighth rate data frames (1200 bps frames of rate set 1 and 1800 bps frames of rate set 2) is repeated seven times, or stated alternatively, each code symbol in eighth rate data frames occurs eight consecutive times. It is appreciated that these different symbol repetition rates are used by frame rate determination device 200 of FIG. 2B to process the four different rate hypotheses corresponding to the four possible frame rates of each of rate set 1 and rate set 2.

Referring still to FIG. 3, in step 320, frame rate determination device 200 generates decoded bit streams from the demodulated soft symbols for testing the four rate hypotheses. In one embodiment, the demodulated soft symbols are decoded four times, each time testing the received data frame against one of the four rate hypotheses corresponding to the four possible frame rates. A more detailed description of step 320 in accordance with one embodiment of the present invention is provided with reference to FIG. 4 below.

Figure 4:
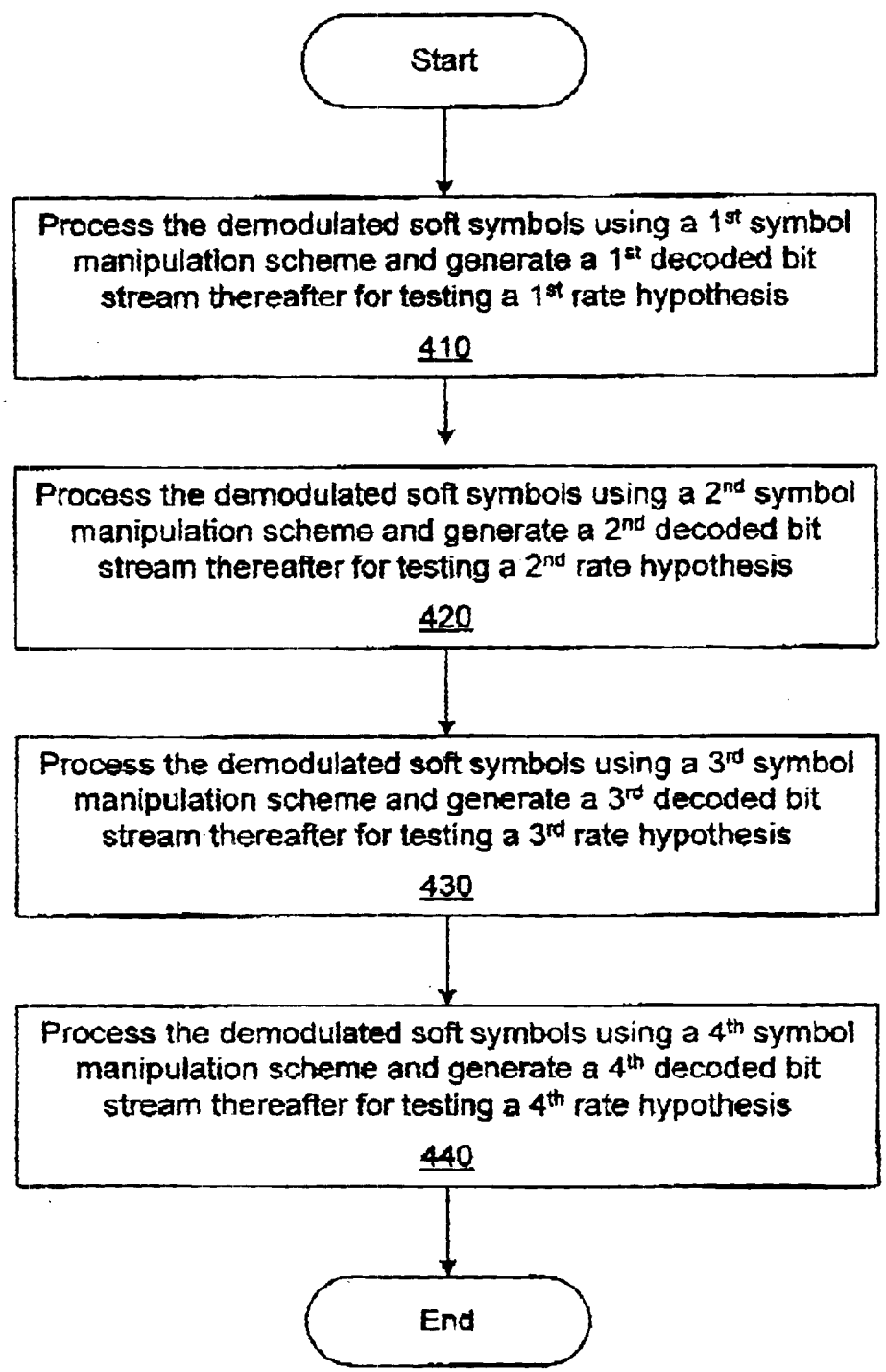
FIG. 4 is a flow chart of steps for generating decoded bit streams from demodulated soft symbols for testing various rate hypotheses for the frame rate of a data frame in accordance with one embodiment of the present invention.

With reference now to FIG. 4, a flow chart 400 of steps for generating decoded bit streams from demodulated soft symbols for testing various rate hypotheses for the frame rate of a data frame in accordance with one embodiment of the present invention is shown. More particularly, step 320 of process 300 (FIG. 3) is described in greater detail in accordance with one embodiment of the present invention. As shown in step 410, decoder 211 of frame rate determination device 200 processes the demodulated soft symbols using a first symbol manipulation scheme and generates a first decoded bit stream thereafter for testing a first rate hypothesis.

In step 420, decoder 221 of frame rate determination device 200 processes the demodulated soft symbols using a second symbol manipulation scheme and generates a second decoded bit stream thereafter for testing a second rate hypothesis.

In step 430, decoder 231 of frame rate determination device 200 processes the demodulated soft symbols using a third symbol manipulation scheme and generates a third decoded bit stream thereafter for testing a third rate hypothesis.

In step 440, decoder 241 of frame rate determination device 200 processes the demodulated soft symbols using a fourth symbol manipulation scheme and generates a fourth decoded bit stream thereafter for testing a fourth rate hypothesis.

Thus, in the instant embodiment, the demodulated soft symbols are decoded four times, each time testing the received data frame against one of the four rate hypotheses corresponding to the four possible frame rates. More particularly, with reference again to FIG. 2B, in accordance with the symbol repetition rates described above, no symbol combining is needed for testing the rate hypothesis of the full rate (9600 bps for rate set 1 and 14400 bps for rate set 2), and decoder 211 receives the demodulated soft symbols directly from receiver 202. As such, in this embodiment, the first symbol manipulation scheme of step 410 of process 400 (FIG. 4) is a pass-through of the demodulated soft symbols with no symbol combining being performed.

On the other hand, for testing the rate hypothesis of the half rate (4800 bps for rate set 1 and 7200 bps for rate set 2), two-to-one symbol combining is performed as the second symbol manipulation scheme in step 420 of process 400 by combiner 226, which then passes the de-repeated demodulated soft symbols to decoder 221. Similarly, for testing the rate hypothesis of the quarter rate (2400 bps for rate set 1 and 3600 bps for rate set 2), four-to-one symbol combining is performed as the third symbol manipulation scheme in step 430 of process 400 by combiner 236, which then passes the de-repeated demodulated soft symbols to decoder 231. Likewise, for testing the rate hypothesis of the quarter rate (1200 bps for rate set 1 and 1800 bps for rate set 2), eight-to-one symbol combining is performed as the fourth symbol manipulation scheme in step 440 of process 400 by combiner 246, which then passes the de-repeated demodulated soft symbols to decoder 241.

In a preferred embodiment of the present invention, decoders 211, 221, 231 and 241 of frame rate determination device 200 are Viterbi decoders. It is appreciated that a Viterbi decoder is capable of correcting much of the errors that may exist in the data frame and is therefore commonly used to decode demodulated soft symbols.

Referring back to FIG. 3, in step 330, encoders 212, 222, 232 and 242 of frame rate determination device 200 re-encode the respective decoded bit streams received from decoders 211, 221, 231 and 241 to generate corresponding re-encoded bit streams.

In one embodiment of the present invention, where the demodulated soft symbols have been combined prior to decoding, the symbols in the re-encoded bit streams need to be repeated so that they can be meaningfully correlated with the original stream of demodulated soft symbols. More specifically, code symbols are not repeated for the re-encoded bit stream corresponding to the full rate hypothesis. Each code symbol in the re-encoded bit stream corresponding to the half rate hypothesis is repeated once (each symbol occurs twice consecutively) by repeater 227. Similarly, each code symbol in the re-encoded bit stream corresponding to the quarter rate hypothesis is repeated three times (each symbol occurs four consecutive times) by repeater 237. Likewise, each code symbol in the re-encoded bit stream corresponding to the eighth rate hypothesis is repeated seven times (each symbol occurs eight consecutive times) by repeater 247. It is appreciated that such symbol repetition reverses the symbol de-repetition performed by combiners 226, 236 and 246 of frame rate determination device 200 of FIG. 2B.

Referring again to FIG. 3, in step 340, correlators 213, 223, 233 and 243 of frame rate determination device 200 generates correlation metrics corresponding to the rate hypotheses by correlating each of the re-encoded bit streams with the original demodulated soft symbols.

In a preferred embodiment with four rate hypotheses, the correlation metrics, denoted as m0, m1, m2 and m3, are computed as follows:

$$m0 = \sum_{i=0}^{N-1} \text{rx\_sym}(i) * \text{enc\_sym0}(i)$$

$$m1 = \sqrt{2} \sum_{i=0}^{N-1} \text{rx\_sym}(i) * \text{enc\_sym1}(i)$$

$$m2 = 2 \sum_{i=0}^{N-1} \text{rx\_sym}(i) * \text{enc\_sym2}(i)$$

$$m3 = 2\sqrt{2} \sum_{i=0}^{N-1} \text{rx\_sym}(i) * \text{enc\_sym3}(i)$$

where

N=384 for rate set 1 and N=576 for rate set 2
rx_sym(i)=original demodulated soft symbols stream
enc_sym0(i)=re-encoded bit stream for the full rate hypo.
enc_sym1(i)=re-encoded bit stream for the half rate hypo.
enc_sym2(i)=re-encoded bit stream for the qtr. rate hypo.
enc_sym3(i)=re-encoded bit stream for the eighth rate hypo.

It is appreciated that for rate set 1, the symbols are not de-punctured, so the number of soft symbols used for decoding (N) equals the number of demodulated soft symbols in the received data frame, namely, 384. For rate set 2, on the other hand, the 384 demodulated soft symbols are de-punctured into 576 soft symbols for decoding, so N=576 for rate set 2. It is further appreciated that in the presence of channel noise, which is prevalent in a CDMA spread spectrum system, these correlation metrics, which are computed based on received soft symbols in accordance with the present invention, serve as a more robust and more accurate predicate for the actual frame rate of a transmitted data frame than the prior art symbol error rate computed based on hard-limited symbols. In particular, these correlation metrics provide a reliability level of 1 error out of 100000 frames or better, even in the presence of high channel noise. Thus, the present invention allows frame rates to be accurately determined by a receiving unit and as such frame data including synthesized voice can be transmitted over the CDMA system with minimal distortion.

Referring still to FIG. 3, in step 350, checkers 215, 225, 235 and 245 of frame rate determination device 200 generates a frame quality indicator for each of the re-encoded bit streams which has a cyclic redundancy code (CRC) coupled thereto.

In one embodiment of the present invention, all data frames of rate set 2 (14400, 7200, 3600 and 1800 bps frames as described above) and the 9600 and 4800 bps data frames of rate set 1 each has a CRC coupled thereto, whereas the 2400 and 1200 bps data frames of rate set 1 do not have any CRC. Thus, except for the rate hypotheses corresponding to the 2400 and 1200 bps frame rates, a CRC check is performed by checkers 215, 225, 235 and 245, as appropriate, to generate respective frame quality indicators corresponding to the rate hypotheses being tested. It is appreciated that the frame quality indicator of a data frame not only indicates whether the data frame is in error, but also assists in the frame rate determination of the received data frame.

With reference still to FIG. 3, in step 360, frame rate determination logic unit (FRD) 280 of frame rate determination device 200 determines the frame rate of the data frame using the correlation metrics generated in step 340 and the frame quality indicators generated in step 350. A more detailed description of step 360 in accordance with one embodiment of the present invention is provided with reference to FIG. 5 below.

Figure 5:
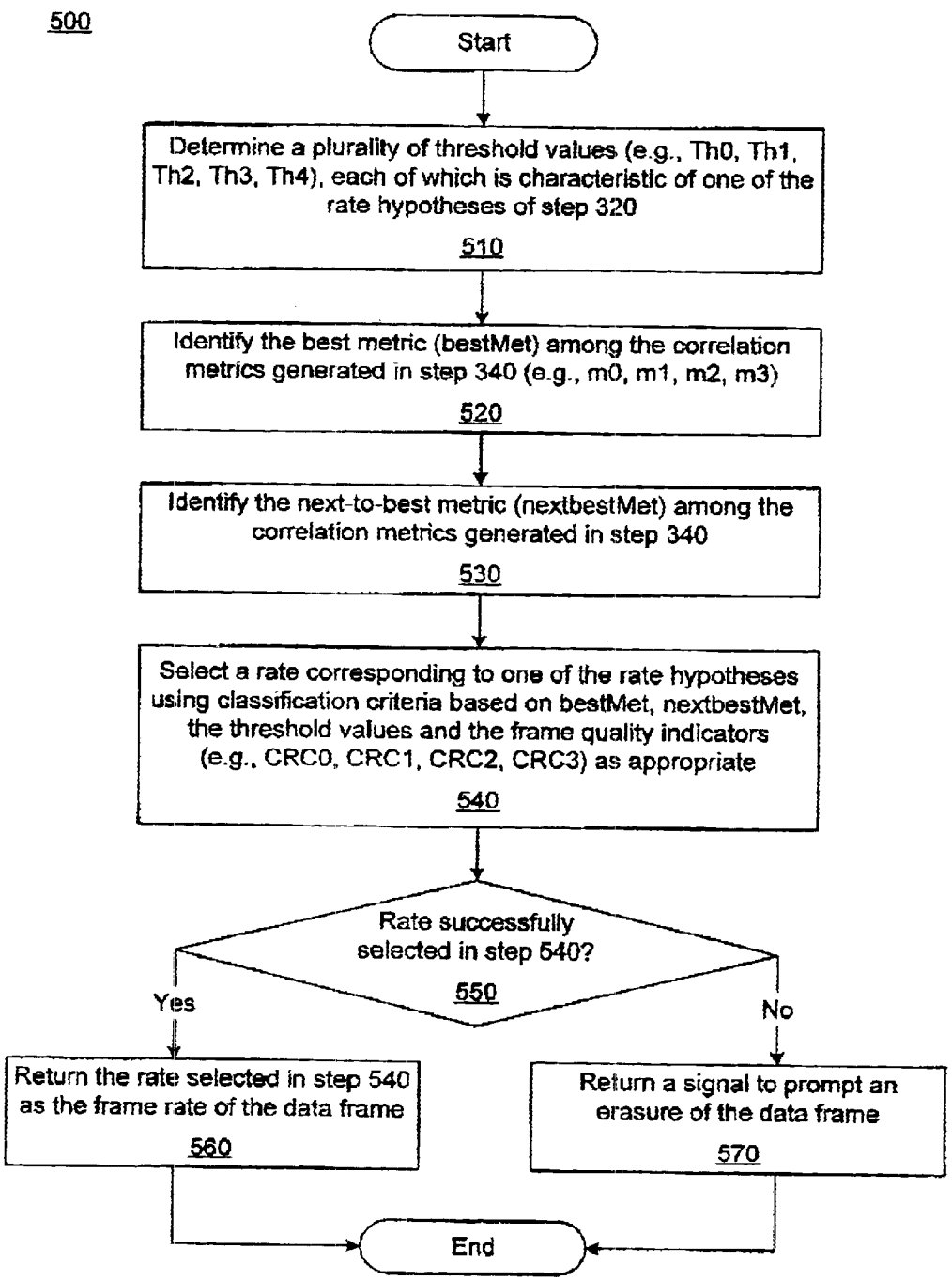
FIG. 5 is a flow chart of steps for determining the frame rate of a data frame using correlation metrics and frame quality indicators in accordance with one embodiment of the present invention.

With reference now to FIG. 5, a flow chart 500 of steps for determining the frame rate of a data frame using correlation metrics and frame quality indicators in accordance with one embodiment of the present invention is shown. More particularly, step 360 of process 300 (FIG. 3) is described in greater detail in accordance with one embodiment of the present invention. As shown in step 510, threshold values which are characteristic of the rate hypotheses described above are determined.

In a preferred embodiment, these threshold values are determined by simulation. Provided herein are some exemplary threshold values for rate set 1 and rate set 2 in accordance with one embodiment of the present invention:

| Threshold name | Value |
|---|---|
| Th0 | 6 |
| Th1 | 2 |
| Th2 | 11 |
| Th3 | 10 |
| Th4 | 10 |

Exemplary threshold values for rate set 1

| Threshold name | Value |
|---|---|
| Th0 | 46 |
| Th1 | 17 |
| Th2 | 8 |
| Th3 | 5 |

Exemplary threshold values for rate set 2

It is appreciated that within the scope of the present invention, the threshold values are computed based on empirical, experimental results derived from extensive simulation of data frame transmissions over CDMA spread spectrum systems. These threshold values have been identified as highly relevant in frame rate determination using correlation metrics in accordance with the present invention.

Referring still to FIG. 5, in step 520, FRD 280 of frame rate determination device 200 identifies the best metric (bestMet) among the correlation metrics generated in step 340 of process 300 (FIG. 3). In one embodiment, bestMet is the one with the maximum value among the four correlation metrics generated.

With reference still to FIG. 5, in optional step 530, FRD 280 of frame rate determination device 200 identifies the next-to-best metric (nextbestMet) among the correlation metrics generated in step 340 of process 300 (FIG. 3). In one embodiment, nextbestMet is the one with the second largest value among the four correlation metrics generated.

In step 540, FRD 280 of frame rate determination device 200 selects a rate corresponding to one of the rate hypotheses using classification criteria based on bestMet, nextbestMet, the threshold values and the frame quality indicators as appropriate. A more detailed description of step 540 in accordance with different embodiments of the present invention is provided with reference to FIGS. 6 and 7 below.

Figure 6:
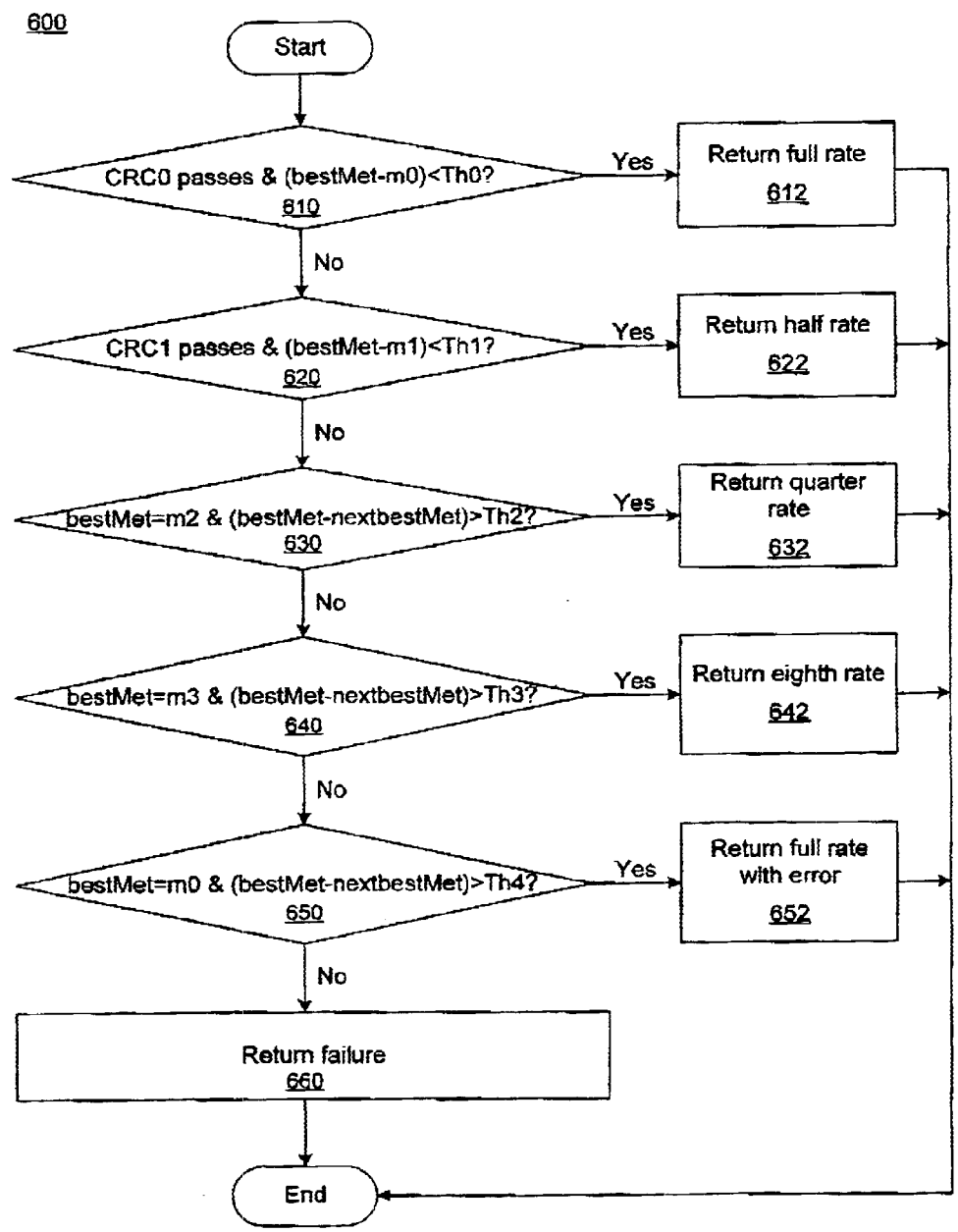
FIG. 6 is a flow chart of steps for selecting a rate corresponding to one of the various rate hypotheses using classification criteria based on correlation metrics, threshold values and frame quality indicators in accordance with one embodiment of the present invention.

With reference now to FIG. 6, a flow chart 600 of steps for selecting a rate corresponding to one of the various rate hypotheses using classification criteria based on correlation metrics, threshold values and frame quality indicators in accordance with one embodiment of the present invention is shown. More particularly, step 540 of process 500 (FIG. 5) is described in greater detail in accordance with a preferred embodiment for use with rate set 1. As shown in step 610, if the frame quality indicator corresponding to the full rate hypothesis (denoted CRC0) passes, and the difference between bestMet and the correlation metric corresponding to the full rate hypothesis (m0) is less than threshold value Th0, then the instant embodiment proceeds to step 612, wherein the full rate (9600 bps) is returned; otherwise, the instant embodiment proceeds to step 620.

In step 620, if the frame quality indicator corresponding to the half rate hypothesis (denoted CRC1) passes, and the difference between bestMet and the correlation metric corresponding to the half rate hypothesis (m1) is less than threshold value Th1, then the instant embodiment proceeds to step 622, wherein the half rate (4800 bps) is returned; otherwise, the instant embodiment proceeds to step 630.

In step 630, if bestMet equals the correlation metric corresponding to the quarter rate hypothesis (m2), and the difference between bestMet and nextbestMet is greater than threshold value Th2, then the instant embodiment proceeds to step 632, wherein the quarter rate (2400 bps) is returned; otherwise, the instant embodiment proceeds to step 640.

In step 640, if bestMet equals the correlation metric corresponding to the eighth rate hypothesis (m3), and the difference between bestMet and nextbestMet is greater than threshold value Th3, then the instant embodiment proceeds to step 642, wherein the eighth rate (1200 bps) is returned; otherwise, the instant embodiment proceeds to step 650.

It is noted that since no frame quality indicator is present in quarter rate (2400 bps) and eighth rate (1200 bps) data frames in rate set 1, no frame quality indicator is computed for the rate hypotheses corresponding to these two rates. Rather, additional information about the frame rate are derived from bestMet and nextbestMet in accordance with this embodiment of the present invention, as described above in steps 630 and 640.

Referring still to FIG. 6, in step 650, if bestMet equals the correlation metric corresponding to the full rate hypothesis (m0), and the difference between bestMet and nextbestMet is greater than threshold value Th4, then the instant embodiment proceeds to step 652, wherein the result "full rate with error" is returned; otherwise, the instant embodiment proceeds to step 660.

It is appreciated that the TR45-Standards, described above, requires that the result "full rate with error" be returned when it is determined that the frame rate of the received data frame is mostly likely 9600 bps (full rate) and yet the frame quality indicator corresponding to the full rate hypothesis (CRC0) does not pass. Thus, step 650 is included in the instant embodiment for compliance with the TR45 Standards.

Referring still to FIG. 6, in step 660, the instant embodiment returns a failure, indicating that a rate in rate set 1 cannot be successfully selected for the received data frame based on the classification criteria of the instant embodiment.

Figure 7:
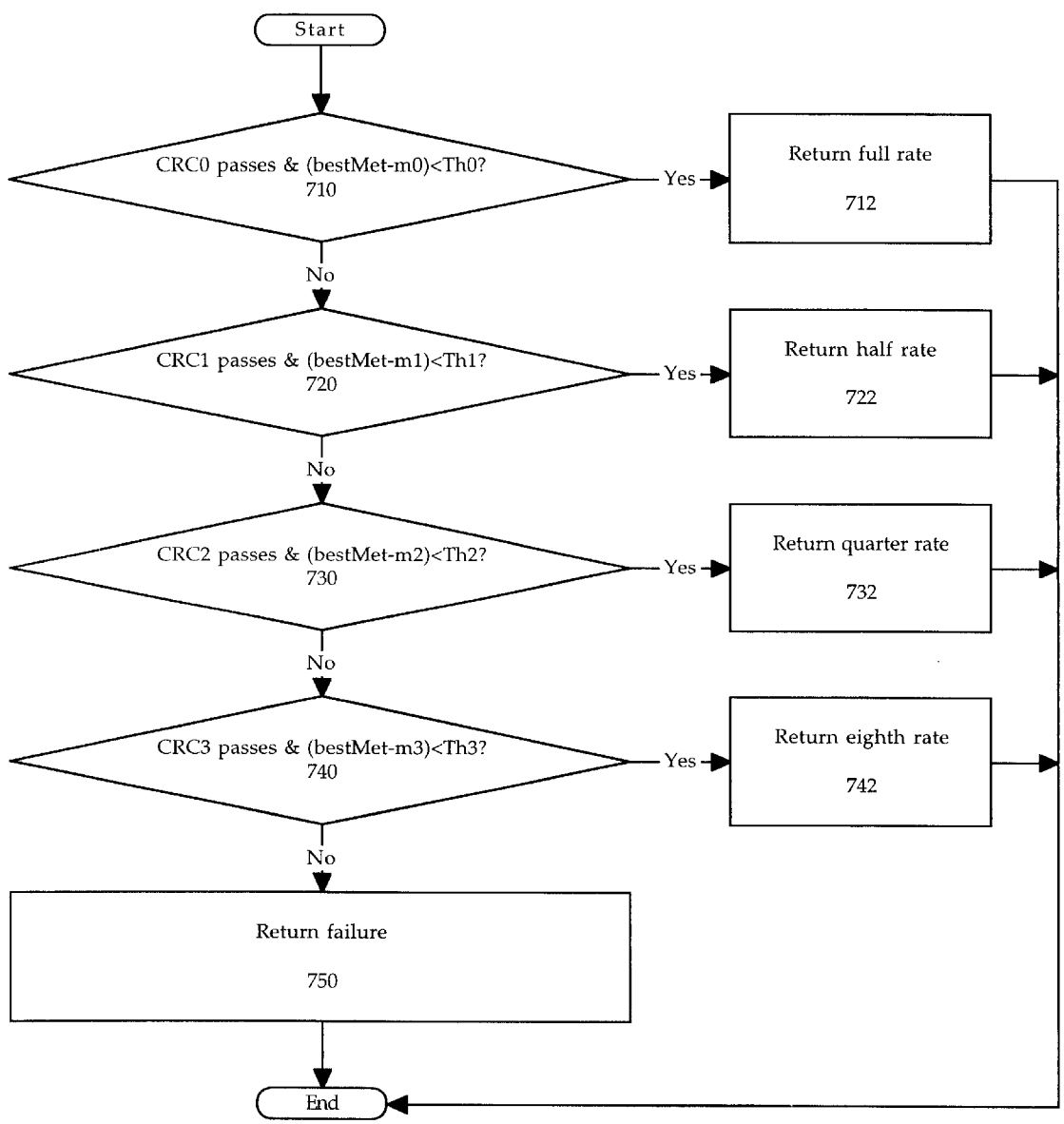
FIG. 7 is a flow chart of steps for selecting a rate corresponding to one of the various rate hypotheses using classification criteria based on correlation metrics, threshold values and frame quality indicators in accordance with another embodiment of the present invention.

With reference next to FIG. 7, a flow chart 700 of steps for selecting a rate corresponding to one of the various rate hypotheses using classification criteria based on correlation metrics, threshold values and frame quality indicators in accordance with another embodiment of the present invention is shown. More particularly, step 540 of process 500 (FIG. 5) is described in greater detail in accordance with a preferred embodiment for use with rate set 2. As shown in step 710, if the frame quality indicator corresponding to the full rate hypothesis (denoted CRC0) passes, and the difference between bestMet and the correlation metric corresponding to the full rate hypothesis (m0) is less than threshold value Th0, then the instant embodiment proceeds to step 712, wherein the full rate (14400 bps) is returned; otherwise, the instant embodiment proceeds to step 720.

In step 720, if the frame quality indicator corresponding to the half rate hypothesis (denoted CRC1) passes, and the difference between bestMet and the correlation metric corresponding to the half rate hypothesis (m1) is less than threshold value Th1, then the instant embodiment proceeds to step 722, wherein the half rate (7200 bps) is returned; otherwise, the instant embodiment proceeds to step 730.

In step 730, if the frame quality indicator corresponding to the quarter rate hypothesis (denoted CRC2) passes, and the difference between bestMet and the correlation metric corresponding to the quarter rate hypothesis (m2) is less than threshold value Th2, then the instant embodiment proceeds to step 732, wherein the quarter rate (3600 bps) is returned; otherwise, the instant embodiment proceeds to step 740.

In step 740, if the frame quality indicator corresponding to the eighth rate hypothesis (denoted CRC3) passes, and the difference between bestMet and the correlation metric corresponding to the eighth rate hypothesis (m3) is less than threshold value Th3, then the instant embodiment proceeds to step 722, wherein the eighth rate (1800 bps) is returned; otherwise, the instant embodiment proceeds to step 750.

In step 750, the instant embodiment returns a failure, indicating that a rate in rate set 2 cannot be successfully selected for the received data frame based on the classification criteria of the instant embodiment.

With reference back to FIG. 5, if it is determined in step 550 that a rate has been successfully selected in step 540, then the present embodiment proceeds to step 560 wherein the selected rate is returned as the frame rate of the data frame.

Referring still to FIG. 5, if it is determined in step 550 that a rate cannot be selected in step 540 based on the classification criteria therein, then the present embodiment proceeds to step 570 wherein a signal is returned to prompt an erasure of the data frame.

It is appreciated that while the present invention is illustrated above with reference to a device and method that facilitates frame rate determination using four rate hypotheses, the present invention is easily adapted for use with any number of rate hypotheses. Additionally, it is understood that the present invention is well suited for use with any variable rate communication systems which require that frame rate determination be made under prescribed circumstances. While a TR45 CDMA cellular system is used in the foregoing description as an exemplary embodiment of the present invention, it is appreciated that the device and method of the present invention is also easily adapted to perform frame rate determination in other CDMA based cellular systems, such as those being proposed in Europe and Japan. Furthermore, although specific device architectures are shown in the embodiments of FIGS. 1, 2A and 2B, the present invention is also well suited to using various alternatives, modifications, and equivalents, which are included within the spirit and scope of the present claimed invention.

Thus, by furnishing a mechanism that facilitates frame rate determination using correlation metrics based on soft symbols and frame quality indicators, the present invention provides a method and device which performs frame rate determination with the high accuracy and reliability required in modern communication systems. It is noted once again that prior art frame rate determination approaches are not desirable in a variable rate communication system with a noisy data channel because those approaches employ the symbol error rate based on hard-limited symbols which is often a highly inaccurate predicate of the frame rate of a data frame when the data channel is very noisy.

Furthermore, by employing inexpensive and commonly available components such as correlators and accumulators, the present invention provides a method and device which performs frame rate determination that can be implemented in a very cost-efficient manner in existing variable rate communication systems. Moreover, by using components that are commonly used in the art, such as Viterbi decoders, the present invention does not require expensive retrofitting of existing communication systems. Thus, the present invention is highly conducive for use with existing communication systems.

Thus, the present invention provides a method and device for determining a frame rate of a data frame transmitted over a variable rate communication system. The present invention accomplishes the above achievements with a method and device which performs frame rate determination using correlation metrics and frame quality indicators. The present invention delivers accurate frame rate determination even in an environment with a high level of channel noise by using correlation metrics based on soft symbols rather than hard-limited symbols as are used in the prior art. Moreover, the present invention is easy to implement either by hardware or software, and is also conducive to use with existing variable rate communication systems such as a CDMA spread spectrum system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of determining a frame rate of a data frame received over a variable rate communication system, wherein the method comprises:
generating a plurality of decoded bit streams from demodulated soft symbols representing the data frame;
re-encoding each of the decoded bit streams;
correlating each of the re-encoded bit streams with the demodulated soft symbols to generate a respective correlation metric;
for each of the decoded bit streams having a cyclic redundancy code, generating a frame quality indicator;
determining the frame rate as a function of,
at least one of the frame quality indicators,
a best of the correlation metrics, and
a next-best of the correlation metrics; and
further determining the frame rate as a function of a plurality of predetermined threshold values each associated with a respective one of the correlation metrics, wherein each of the decoded bit streams, each of the correlation metrics, and each of the predetermined threshold values respectively corresponds to one of a plurality of data rate hypotheses comprising full rate, half rate, quarter rate, and eighth rate.

2. The method of claim 1 wherein the predetermined threshold values comprise 6, 2, 11, and 10.

3. The method of claim 1 wherein the predetermined threshold values comprise 46, 17, 8, and 5.

4. The method of claim 1 wherein the predetermined threshold values further include a fifth value corresponding to a data rate hypothesis of full rate with error.

5. The method of claim 4 wherein the predetermined threshold values comprise 6, 2, 11, 10, and 10.

6. The method of claim 1 wherein the function comprises:
(a) if a first rate hypothesis's cyclic redundancy code passes and a difference between the first rate hypothesis's correlation metric and the best correlation metric is less than a first predetermined threshold value, then the first rate hypothesis is determined to be the frame rate;
(b) else if a second rate hypothesis's cyclic redundancy code passes and a difference between the second rate hypothesis's correlation metric and the best correlation metric is less than a second predetermined threshold value, then the second rate hypothesis is determined to be the frame rate;
(c) else if a third rate hypothesis's correlation metric is the best correlation metric and a difference between the best correlation metric and the next-best correlation metric is greater than a third predetermined threshold value, then the third rate hypothesis is determined to be the frame rate; and
(d) else if a fourth rate hypothesis's correlation metric is the best correlation metric and a difference between the best correlation metric and the next-best correlation metric is greater than a fourth predetermined threshold value, then the fourth rate hypothesis is determined to be the frame rate.

7. The method of claim 6 wherein the first through fourth predetermined threshold values are substantially 6, 2, 11, and 10, respectively.

8. The method of claim 7 wherein the first through fourth predetermined threshold values are exactly 6, 2, 11, and 10, respectively.

9. The method of claim 7 wherein the first through fifth predetermined threshold values are exactly 6, 2, 11, 10, and 10, respectively.

10. The method of claim 6 wherein the function further comprises:
(e) else if the first rate hypothesis's correlation metric is the best correlation metric and a difference between the best correlation metric and the next-best correlation metric is greater than a fifth predetermined threshold value, then the first rate hypothesis with error is determined to be the frame rate.

11. The method of claim 10 wherein the function further comprises:
(f) else indicate that the function has failed to determine a frame rate.

12. The method of claim 6 wherein the first through fifth predetermined threshold values are substantially 6, 2, 11, 10, and 10, respectively.

13. The method of claim 6 wherein the first through fourth rate hypotheses comprise full rate, half rate, quarter rate, and eighth rate, respectively.

14. The method of claim 1 wherein the function comprises:
(a) if a first rate hypothesis's cyclic redundancy code passes and a difference between the first rate hypothesis's correlation metric and the best correlation metric is less than a first predetermined threshold value, then the first rate hypothesis is determined to be the frame rate;
(b) else if a second rate hypothesis's cyclic redundancy code passes and a difference between the second rate hypothesis's correlation metric and the best correlation metric is less than a second predetermined threshold value, then the second rate hypothesis is determined to be the frame rate;
(c) else if a third rate hypothesis's cyclic redundancy code passes and a difference between the third rate hypothesis's correlation metric and the best correlation metric is less than a third predetermined threshold value, then the third rate hypothesis is determined to be the frame rate; and
(d) else if a fourth rate hypothesis's cyclic redundancy code passes and a difference between the fourth rate hypothesis's correlation metric and the best correlation metric is less than a fourth predetermined threshold value, then the fourth rate hypothesis is determined to be the frame rate.

15. The method of claim 14 wherein the first through fourth predetermined threshold values are substantially 46, 17, 8, and 5, respectively.

16. The method of claim 15 wherein the first through fourth predetermined threshold values are exactly 46, 17, 8, and 5, respectively.

17. The method of claim 14 wherein the function further comprises:
(e) else indicate that the function has failed to determine a frame rate.

18. The method of claim 14 wherein the first through fourth rate hypotheses comprise full rate, half rate, quarter rate, and eighth rate, respectively.

19. An article of manufacture comprising:
a medium bearing data that, when accessed by a machine, cause the machine to perform the method of claim 1.

20. The article of manufacture of claim 19 wherein the medium bears additional data that, when accessed by the bit streams from demodulated soft symbols representing a data frame;
means for re-encoding each of the decoded bit streams;
means for correlating each of the re-encoded bit streams with the demodulated soft symbols to generate a respective correlation metric, wherein at least two of the correlation metrics can be significantly non-zero;
means for generating a frame quality indicator for each of the decoded bit streams having a cyclic redundancy code; and
means for determining the frame rate as a function of,
at least one of the frame quality indicators,
a best of the correlation metrics, and
a next-best of the correlation metrics.

21. The article of manufacture of claim 19 wherein the medium bears additional data that, when accessed by the machine, cause the machine to perform the method of claim 14.

22. The article of manufacture of claim 19 wherein the medium comprises a recording medium.

23. The article of manufacture of claim 22 wherein the medium the medium bears additional data that, when accessed by the machine, cause the machine to perform the method of claim 1.

24. An apparatus comprising:
means for generating a plurality of decoded bit streams from demodulated soft symbols representing a data frame;
means for re-encoding each of the decoded bit streams;
means for correlating each of the re-encoded bit streams with the demodulated soft symbols to generate a respective correlation metric, wherein at least two of the correlation metrics can be significantly non-zero;
means for generating a frame quality indicator for each of the decoded bit streams having a cyclic redundancy code; and
means for determining a frame rate as a function of,
at least one of the frame quality indicators,
a best of the correlation metrics, and
a next-best of the correlation metrics; and
wherein the means for determining the frame function includes logic for performing the function, the logic comprising:
(a) logic for determining a first rate hypothesis as the frame rate if the first rate hypothesis's cyclic redundancy code passes and a difference between the first rate hypothesis's correlation metric and the best correlation metric is less than a first predetermined threshold value;
(b) logic for determining a second rate hypothesis as the frame rate if the second rate hypothesis's cyclic redundancy code passes and a difference between the second rate hypothesis's correlation metric and the best correlation metric is less than a second predetermined threshold value;
(c) logic for determining a third rate hypothesis as the frame rate if the third rate hypothesis's correlation metric is the best correlation metric and a difference between the best correlation metric and the next-best correlation metric is greater than a third predetermined threshold value; and
(d) logic for determining a fourth rate hypothesis as the frame rate if the fourth rate hypothesis's correlation metrics is the best correlation metric and a difference between the best correlation metric and the next-best correlation metric is greater than a fourth predetermined threshold value.

25. The apparatus of claim 24 wherein the logic further comprises:
(e) logic for determining the first rate hypothesis with error as the frame rate if the first rate hypothesis's correlation metric is the best correlation metric and a difference between the best correlation metric and the next-best correlation metric is greater than a fifth predetermined threshold value.

26. The apparatus of claim 25 wherein the logic further comprises:
(f) logic for indicating that the function has failed to determine a frame rate.

27. The apparatus of claim 24 wherein the means for determining the frame function includes logic for performing the function, the logic comprising:
(a) if a first rate hypothesis's cyclic redundancy code passes and a difference between the first rate hypothesis's correlation metric and the best correlation metric is less than a first predetermined threshold value, then the first rate hypothesis is determined to be the frame rate;
(b) else if a second rate hypothesis's cyclic redundancy code passes and a difference between the second rate hypothesis's correlation metric and the best correlation metric is less than a second predetermined threshold value, then the second rate hypothesis is determined to be the frame rate;
(c) else if a third rate hypothesis's cyclic redundancy code passes and a difference between the third rate hypothesis's correlation metric and the best correlation metric is less than a third predetermined threshold value, then the third rate hypothesis is determined to be the frame rate; and
(d) else if a fourth rate hypothesis's cyclic redundancy code passes and a difference between the fourth rate hypothesis's correlation metric and the best correlation metric is less than a fourth predetermined threshold value, then the fourth rate hypothesis is determined to be the frame rate.

28. The apparatus of claim 24 wherein the best correlation metric is one of the correlation metrics which has a largest value and the next-best correlation metric is one of the correlation metrics which has a second-largest value.

29. The apparatus of claim 24 embodied as a code division multiple access cellular telephone receiver.

* * * * *

UNITED STATES PATENT AND TRADEMARK OFFICE
CERTIFICATE OF CORRECTION

PATENT NO. : 6,633,601 B1 Page 1 of 1
DATED : October 14, 2003
INVENTOR(S) : Gordon Guowen Yang It is certified that error appears in the above-identified patent and that said Letters Patent is hereby corrected as shown below:

Title page,
Item [73], Assignee, below "Koninklijke Philips Electronics N.V." add -- Texas Instruments Incorporated, Dallas TX (US) --.

Signed and Sealed this

First Day of November, 2005

JON W. DUDAS
*Director of the United States Patent and Trademark Office*